United States Patent
Eickmann

[15] 3,654,761

[45] Apr. 11, 1972

[54] FLUID HANDLING DEVICE WITH RADIALLY VARIABLE WORKING CHAMBERS

[72] Inventor: Karl Eickmann, 2420 Isshiki, Kanagawa-ken, Hayama-machi, Japan

[22] Filed: Jan. 29, 1970

[21] Appl. No.: 6,668

[30] Foreign Application Priority Data

Jan. 31, 1969 Austria ..............................A 1014/69

[52] U.S. Cl..............................................60/53 B, 91/497
[51] Int. Cl..................................................F15b 15/18
[58] Field of Search.....................................60/53 B

[56] References Cited

UNITED STATES PATENTS 2,176,401  10/1939  Johns ......................................60/53 B
2,993,339  7/1961   Timms.....................................60/53 B Primary Examiner—Edgar W. Geoghegan
Attorney—Michael S. Striker

[57] ABSTRACT

The two rotors of a fluid handling device, such as a pump-motor hydrostatic transmission, are positioned adjacent each other in axial direction by thrust bearings at the outer axial ends of the rotors so that the confronting inner end faces of the rotors form a fluid filled gap in which spacing means, such as a rotary disc and roller bearings, can be provided.

12 Claims, 1 Drawing Figure

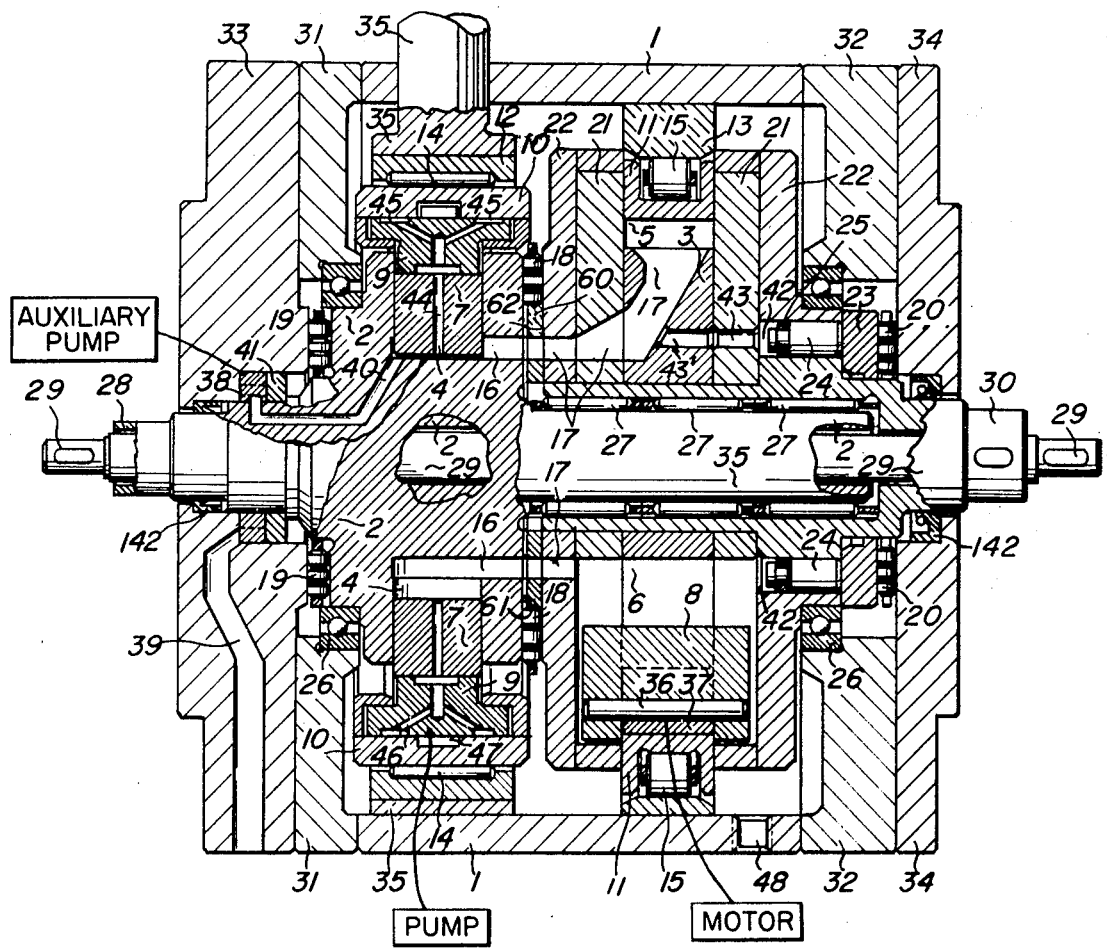

FLUID HANDLING DEVICE WITH RADIALLY VARIABLE WORKING CHAMBERS

BACKGROUND OF THE INVENTION

The present invention relates to a fluid handling device with radially variable working chambers in which two rotors run independently of each other, and at least some times at different speeds, and more particularly to a hydrostatic transmission. However, generally speaking hydrostatic pumps and motors, hydrostatic-mechanical transmissions, gas motors, compressors, combustion engines, air engines, steam engines and the like can be constructed as fluid handling devices with radially variable working chambers and with radially movable fluid displacing elements in the working chambers.

The term "fluid handling device with radially variable working chambers" is used in the present application to refer to machines with working chambers filled with fluid, whose volume is cyclically increased or decreased in radial or substantially radial direction by displacement elements, such as pistons or vanes, reciprocating in the working chambers.

Fluid handling devices of this type have been successfully used, but have not obtained the high efficiency of other transmissions, for example of a gear transmission. Furthermore, the manufacturing cost is very high so that use of this type of transmission is not economical.

The main reason for the insufficient efficiency of fluid handling devices of this type is the high leakage and friction between surfaces moving relative to each other, particularly if the relative speed of the contacting surfaces is high.

SUMMARY OF THE INVENTION

It is one object of the invention to overcome the disadvantages of fluid handling devices of the prior art, and to provide a fluid handling device, such as a hydrostatic transmission, which has low leakage and friction losses, and consequently a high efficiency.

Another object of the invention is to provide a fluid handling device in which cooperating moving surfaces rotate at a low relative speed.

With these objects in view, the present invention provides at least two axially adjacent rotors whose axially outer ends are supported by thrust bearings. Between the two rotors control means are provided through which the fluid flows between the working chambers of the rotors. In accordance with the invention, the two rotors have inner confronting control faces through which the fluid flows between the working chambers of the rotors. Due to this arrangement, the control faces which are provided in prior art constructions at the outer ends of the rotors, are eliminated, and the friction and leakage caused by the same avoided. In this manner, the efficiency and output of the machine is increased.

In the preferred embodiment of the invention, a rotary control disc is placed between the inner confronting control faces of the two rotors, and has at least one opening through which the fluid flows between the working chamber of the rotors.

The control disc advantageously consists of a different material than the rotors so that low friction is obtained between the control faces which are in contact.

In accordance with a preferred modification of the invention, the control disc carries rotary coupling means cooperating with the inner control faces of the two rotors and rolling on the same so that the control disc rotates at a speed which is intermediate the speeds of the two rotors.

Due to the provision of the coupling rollers between the confronting inner control faces of the two rotors, the relative speed between each control face and the control disc is halved so that higher rotary speeds of the rotors become possible, while the friction in the fluid film between the contacting surfaces is reduced due to the low relative speed between the same. This arrangement is of particular importance for a fluid handling device with radially variable working chambers because this type of fluid handling device is suitable for high rotary speeds, which is not the case for fluid handling devices with axially variable working chambers. Due to the arrangement of the invention, the rotors of the fluid handling device can rotate at the speed of high speed gas turbines and combustion engines. In a fluid handling device with radially variable working chambers, different axial forces develop as compared with fluid handling devices in which the working chamber is variable in axial direction, and consequently the arrangement of the present invention is particularly advantageous when applied to fluid handling devices with radially variable working chambers.

In a preferred embodiment of the invention, a fluid pressure means acting in axial direction is provided between one end bearing and the respective rotor to urge the same in axial direction so that the width of the gap between the rotors becomes a minimum, and the cooperating control faces between the rotors abut each other with the required small play even if the bearing means at the ends of the rotors are worn after prolonged use.

As compared with prior art constructions, the present invention saves several control faces and the leakage and friction losses associated with the same so that the efficiency of the fluid handling device according to the invention is high, while the number of parts is reduced.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

A longitudinal sectional view illustrating a preferred embodiment of the invention as incorporated into a hydrostatic or hydrostatic-mechanical transmission.

DESCRIPTION OF THE PREFERRED EMBODIMENTS

A stator includes a cylindrical part 1, two end members 31 and 32, and two end covers 33 and 34. Two rotors 2 and 3 are rotatably mounted in the stator housing supported on ball bearings 26 in end members 31 and 32. Roller bearings 27 support the hub portion of rotor 3 on the hub portion of rotor 2 so that the axial length of the device is short. Rotor 2 has a hollow shaft end portion 28, and rotor 3 has a hollow shaft end portion 30 projecting out of the cover plates 33 and 34, respectively. A shaft 29 passes through shaft portions 30 and 28, and through the rotors 2 and 3 so that the device has two input shafts 28 and 29 and two output shafts 29 and 30 so that the latter can be connected by suitable coupling means, not shown, to other apparatus. Sealing means 142 are provided for the shafts.

Rotor 2 has radially variable working chambers 4 in which radially movable fluid displacing elements 7 are mounted for reciprocation so that the volume of working chambers 4 is cyclically reduced and increased for receiving and discharging fluid, respectively. The fluid displacing elements 7 of rotor 2 are pistons which are operated during rotation of rotor 2 by eccentric means 10, 12, 14, 35 through slide shoes 9 of pistons 7. Instead of cylindrical working chambers 4 and pistons 7, flat working chambers and vanes moving in radial direction may be provided. This construction is shown for rotor 3 which has radial chambers 5 in which displacing elements including rectangular flat vanes 8 and slide shoes 36, 37 are mounted.

Rotor 3 has end walls 21 and cover plates 22 which are part of rotor 3 and rotate with the same. A rotary ring 11 runs on ball bearings 15 in an eccentric stator ring 13, and closes the radially extending working chamber 5, while controlling the radial reciprocating movements of the fluid displacing elements 8, 36, 37.

The vanes and vane chambers of rotor 3 could also be provided in rotor 2, or rotor 3 could be provided with cylindrical working chambers and pistons as shown for rotor 2.

From each working chamber 4 or 5, a conduit 16 or 17, respectively, extends through a part of the respective rotor 2 and 3 and through one of first and second confronting control faces 61 and 62. The fluid flows through an opening in a control disc 6 provided in the gap between the confronting control faces 61 and 62 of rotors 2 and 3. The rotor conduits 16 and 17 have openings in the control faces 61 and 62 and form ports in the same. Fluid flows through the rotor conduits 16 and 17 into the working chambers and out of the same. As indicated by legends, the left part of the illustrated apparatus, including rotor 2, serves as a pump, and the right part, including rotor 3, serves as a hydraulic motor.

The confronting control faces 61 and 62 are shown to be planar, but can be spherical or conical.

The confronting inner end faces 61 and 62 of rotors 2 and 3, and the openings of conduits 16 and 17 in the same form control faces.

The outer ends of the rotors have outer end faces which are supported in axial direction by thrust or end bearings 10 and 20 which abut the inner end faces of end covers 33 and 34 of the stator to hold rotors 2 and 3, and the spacing control disc 30, in a predetermined axial position.

The provision of a control disc 60 is not absolutely necessary, and in a modified arrangement of the invention, the control faces 61 and 62 are in sliding abutment forming a very narrow fluid filled gap between each other. When the rotors 2 and 3 rotate at different speeds, the confronting inner control faces rotate relative to each other while in sliding contact.

As compared with the prior art, control faces at the outer end of two rotors are eliminated, together with the leakages and friction caused by the same. Such leakage and friction losses at the outer ends of the rotors substantially reduce efficiency. The present invention eliminates leakage losses at the outer ends of the rotors completely, and substantially reduces friction losses.

In the prior art construction, the inner control faces also cause great losses. In accordance with the prior art, a stationary control body is provided between confronting inner control faces corresponding to control faces 61 and 62. Since the control body is stationary in the prior art, the relative speed between the rotor controlled faces and the stationary controlled body is very high, causing great friction and leakage. Particularly, at high speeds of the rotors, the friction losses are extremely high. This is also due to the fact that in the prior art two gaps are necessary between the control body and the two control faces of the two rotors.

In the simplified arrangement of the invention, not shown, in which the control faces 61 and 62 slide on each other separated only by a thin film of fluid, only one control gap is provided so that by this very fact leakage is reduced. Furthermore, under certain operational conditions, a great deal of friction is saved in accordance with the invention, when the two rotors run at high rotary speed, but at equal rotary speeds in the same direction so that there is no relative movement between control faces 61 and 62 and the thin fluid film in the gap between the same.

A relative movement between control faces 61 and 62 only occurs when rotors 2 and 3 rotate at different rotary speeds. In the prior art, when a stationary control body is provided between the same, there is a relative speed between each rotor control face and the stationary body, which causes particularly high losses at high rotary speeds of the rotors. In the present invention, irrespective of the height of the rotary speed of the rotors 2 and 3, only the relative speed between the control faces 61 and 62 determines the friction, which is zero if the rotors rotate at the same speeds, even if the speed is very high. Consequently, the apparatus of the invention operates very efficiently even at very high rotary speeds, and can be, consequently, used as a transmission for high-speed combustion motors or gas turbines. However, even for low speed drive motors, such as electromotors or diesel motors, the arrangement of the invention operates more efficiently than known fluid handling devices with radially variable working chambers.

A fluid handling device of the above-described type can only operate if the working chambers are always filled with fluid. In accordance with the invention, the rotor 2, which performs the pumping function in the transmission is provided with an auxiliary pump or compressor 38 which is mounted on cover plate 33 in a recess of the same closed by a closure 41. The rotary part of the pump 38 is driven by the hub portion of rotor 2 so that the fluid flows through an inlet conduit 39 in cover plate 33 into pump 38, and through a conduit 40 into one or several working chambers 4. Check valves, not shown, may be provided in the conduit 40 so that the complete filling of the working chambers with fluid is assured.

As compared with the prior art, in which the feeding of the fluid takes place through stationary parts of the apparatus, the conduit 40 is provided in a portion of rotor 2, and partly through a hub or shaft portion of the same.

In the illustrated embodiment, the confronting control faces 61 and 62 do not slide on each other, but a control disc 60 is positioned in the gap between the same, and spaces the two rotors from each other in axial direction. Control disc 60 has outer faces which are shown to be planar, but which may be spherical or conical to match corresponding spherical or conical control faces 61 and 62 of rotors 2 and 3. Conduit portions or openings pass in axial direction through control disc 60 which at least partly form portions of the conduits 16 and 17 in rotors 2 and 3 which connect the working chambers 4 and 5. It is an advantage of the control disc 60, that it can be made of a smooth material which reduces the friction between the control disc 60 and the control faces 61 and 62 of the two rotors.

In accordance with the invention, control disc 60 carries radially projecting coupling means 18 which include cage means and rollers in rolling contact with control faces 61 and 62. Instead of rollers, gears meshing with gear portions on control faces 61 and 62 may be provided. Due to the fact that the rollers roll simultaneously on control faces 61 and 62, control disc 60 rotates at an intermediate speed between the speeds of control faces 61 and 62 and of rotors 2 and 3, respectively. Due to the fact that the relative speed between the engaging control faces is halved, the friction is substantially reduced in the fluid film between surfaces which move relative to each other. As a result, the efficiency and output of the apparatus is increased, and furthermore it is possible to rotate the rotors at twice the speed of conventional apparatus of this type. However, this advantage can only be obtained with radially variable working chambers, since in apparatus in which the volume of the working chambers is varied in axial direction, the centrifugal forces limit the highest possible speeds of the respective rotor.

In accordance with another feature of the invention, an axial bearing between control faces 61 and 62 may replace the coupling rollers 18. The gap between control faces 61 and 62 is then determined by the distance of the end bearings 19 and 20, the axial lengths of rotors 2 and 3, and the axial thickness of the respective bearings. It is consequently possible to exactly determine the width of the gaps, under consideration of thermal expansion and contraction which can be compensated by selecting suitable materials for the parts. This construction of the invention is a particularly simple and reliable way of determining the width of the gaps between the control faces.

When the spacing means 60, 18 between the control faces 61 and 62 are omitted, and the same slide on each other, the exact axial positions of the rotors can be determined by the axial distance between the end bearings 19 and 20, and by the actual length of the rotors 2 and 3.

In the illustrated embodiment, the bearing means between the control faces 61 and 62 is constructed as a ball bearing 18 whose cage means are part of control disc 60, or radially project from the same so that the respective rollers or balls roll on control faces 61 and 62. The illustrated arrangement effects running of control disc 60 at a median speed between the rotary speeds of rotors 2 and 3, but the rollers also determine the axial spacing of the control faces 61 and 62. When the width of the gaps between control disc 60 and control faces 61 and 62 is calculated, the deformation of the rolls and of the surfaces engaged by the same due to axial pressure must be considered.

While the axial bearings 18, 19 and 20 are shown to be roller bearings, it is possible to substitute hydrostatic, or hydrodynamic thrust bearings or axial bearings for the same. Since bearings of this type are known, they are not illustrated. The use of bearings of this type has the advantage that the axial length and distances of the cooperating parts and surfaces can be easily determined.

In apparatus in which due to thermal fluctuations, or due to deformation by pressure, the gap between cooperating control faces may become too wide, it is preferred to provide axially effective pressure means for urging at least one rotor towards the other. The drawing shows an axial bore 42 in part 22 of rotor 3 into which through conduit 43 in member 21, and conduit 43' in rotor 3, a fluid is guided from an adjacent working chamber 5. An axially moving pressure piston 24 is located in the bore 42, provided with sealing means 25, and abutting the rotary disc 23 which is freely rotatable and located between rotor 3 and ball bearing 20 which is located between rotary disc 23 and the end cover 34 of the stator. The end bearing of rotor 3 consequently includes rotary disc 23 and roller bearing 20. The fluid pressure in bore or bores 42 cannot displace pressure member 24 which abuts disc 23, so that rotor 3 is urged to move toward rotor 2 and the gaps between confronting control faces 61 and 62 and control disc 60 become a minimum. The axial reaction force is transmitted by pressure member 24, disc 23, and roller bearing 20 to the stator cover plate 34.

In accordance with the invention, the pressure member 24 is normally completely retracted into the bore 42 and does not project in axial direction from rotor 3 so that disc 23 can be in contact with the outer end face of rotor 3. Only when a noticeable change of the axial distance between the end bearings 19 and 20 takes place, for example at high pressure, or due to deformations, does pressure member 24 project out of bore 42, abutting rotary disc 23.

The regulator 35 serves in a well known manner to adjust the effective volume of the radial chambers 4 of rotor 2 so that a speed variation is obtained for a hydrostatic transmission, and a discharge volume regulation is obtained for the pump unit to which rotor 2 belongs. Conduits 44 and 46 are provided in he pistons 7 for supplying fluid from the working chambers to the slide faces of the slide shoes 9 which slide on the inner surface of the eccentric ring 10. Needle bearings 14 mount ring 10 in the ring-shaped portion of regulating member 35.

It will be understood that each of the elements described above, or two or more together, may also find a useful application in other types of fluid handling devices differing from the types described above.

While the invention has been illustrated and described as embodied in a hydrostatic transmission including two adjacent rotors , it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Fluid handling device with radially variable working chambers, comprising stator means having confronting inner stator end faces spaced a predetermined axial distance; first and second rotor means supported on said stator means in axially adjacent positions for rotation about a common axis perpendicular to said stator end faces, each rotor means being formed with working chambers, and having fluid displacing elements located in said working chambers for radial movement, said fluid displacing elements being operated by said stator means to reciprocate in said working chambers in radial direction for varying the volume of the same during rotation of the respective rotor means, said first and second rotor means having first and second outer rotor end faces facing in opposite axial directions and located adjacent said inner stator end faces, respectively, parallel with the same, and first and second inner control faces transverse to said axis confronting each other and forming a gap; conduit means connecting said working chambers of said first and second rotor means through said gap and said control faces with each other; and first and second bearing means having a predetermined axial thickness constant also in radial direction and spacing said outer rotor end faces, respectively, in axial direction from said inner stator end faces fro determining the axial positions of said first and second rotor means for maintaining a desired axial thickness of said gap.

2. Fluid handling device as claimed in claim 1 comprising spacing means located in said gap between said first and second control surfaces and including roller bearing means rotatable about radially extending axes, and having roller means in rolling contact with said first and second control faces and having the same constant axial width as said gap.

3. Fluid handling device as claimed in claim 1 comprising spacing means rotatable in said gap and including third bearing means having the same constant axial width as said gap and being in contact with said first and second inner control faces.

4. Fluid handling device with radially variable working chambers, comprising stator means; first and second rotor means supported on said stator means for rotation about a common axis in axially adjacent positions, each rotor means being formed with working chambers, and having fluid displacing elements located in said working chambers for radial movement, said fluid displacing elements being operated by said stator means to reciprocate in said working chambers in radial direction for varying the volume of the same during rotation of the respective rotor means, said first and second rotor means having first and second outer end faces facing in opposite axial directions, and first and second inner control faces transverse to said axis confronting each other and forming a gap; conduit means connecting said working chambers of said first and second rotor means through said gap and said control faces with each other; first and second bearing means mounted on said stator means and supporting said outer end faces, respectively, in axial direction for determining the axial positions of said first and second rotor means; a control disc between said first and second inner control faces, and being freely rotatable about said axis; cage means mounted on said disc projecting from the periphery of the same in radial direction; and coupling roller means mounted in said cage means and being in rolling contact with said first and second inner control faces so that said control disc rotates at a speed intermediate the speeds of said first and second rotor means.

5. Fluid handling device with radially variable working chambers, comprising stator means; first and second rotor means supported on said stator means for rotation about a common axis in axially adjacent positions, each rotor means being formed with working chambers, and having fluid displacing elements located in said working chambers for radial movement, said fluid displacing elements being operated by said stator means to reciprocate in said working chambers in radial direction for varying the volume of the same during rotation of the respective rotor means, said first and second rotor means having first and second outer end faces facing in opposite axial directions, and first and second inner control faces transverse to said axis confronting each other and forming a gap, one of said rotor means being formed with a pressure chamber communicating with at least one of said working chambers, and including a pressure member axially movable in said pressure chamber; conduit means connecting said working chambers of said first and second rotor means through said gap and said control faces with each other; first and second bearing means mounted on said stator means and supporting said outer end faces, respectively, in axial direction for determining the axial positions of said first and second rotor means, one of said bearing means including a disc mounted for rotation on said one rotor means, and an end bearing between said disc and said stator means; said pressure member abutting said disc under pressure so that said one rotor means is urged in axial direction toward the respective other rotor means whereby said gap has minimum thickness.

6. Fluid handling device as claimed in claim 1 comprising fluid pressure means located between at least one of said first and second bearing means and the respective outer end face of the respective rotor means and urging the latter in axial direction toward the respective other rotor means whereby said gap has a minimum thickness.

7. Fluid handling device as claimed in claim 1 comprising a third bearing means located in said gap and being in contact with said first and second inner control faces; and wherein at least one of said bearing means includes a roller bearing having a radial axis.

8. Fluid handling device as claimed in claim 1 comprising a third bearing means located in said gap and being in contact with said first and second inner control faces; and wherein at least one of said first and second bearing means includes axially acting fluid pressure means communicating with at least one of said pressure chambers.

9. Fluid handling device as claimed in claim 1 wherein said conduit means are formed in said first and second rotor means.

10. Fluid handling device as claimed in claim 1, comprising an auxiliary pump mounted on said stator means surrounding a portion of one of said rotor means and operated by the same during rotation of the same; and conduit means in said one rotor means having a port on said portion of said one rotor means communicating with said auxiliary pump for connecting said auxiliary pump with at least one of said working chambers of said one rotor means for pumping fluid into the same during a movement of the respective fluid displacing element causing a volume increase of said one working chamber.

11. Fluid handling device as claimed in claim 1 wherein one of said rotor means has an axially projecting hub portion mounting the other rotor means for rotation about said axis.

12. Fluid handling as claimed in claim 11 device wherein said hub portion is hollow; wherein said other rotor means has an other hub portion mounted on said hollow hub portion for rotation, and a hollow shaft end portion projecting from said other hub portion; and comprising a shaft passing through said hollow hub portion and said hollow shaft.

* * * * *